US012803170B2

(12) United States Patent
Chih et al.

(10) Patent No.: US 12,803,170 B2
(45) Date of Patent: Nov. 17, 2026

(54) WIRELESS TRANSCEIVER

(71) Applicant: Merry Electronics(Shenzhen) Co., Ltd., ShenZhen (CN)

(72) Inventors: Yun Chen Chih, Taichung (TW); Tien-Fu Hung, Taichung (TW); Ming-Hung Tsai, Taichung (TW); Pin-Yi Lee, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 44 days.

(21) Appl. No.: 18/955,921

(22) Filed: Nov. 21, 2024

(65) Prior Publication Data

US 2026/0081354 A1 Mar. 19, 2026

(30) Foreign Application Priority Data

Sep. 18, 2024 (TW) ................................ 113135194

(51) Int. Cl.
*H01Q 9/04* (2006.01)
*H01Q 1/48* (2006.01)

(52) U.S. Cl.
CPC ............ *H01Q 9/0414* (2013.01); *H01Q 1/48* (2013.01)

(58) Field of Classification Search
CPC .............................. H01Q 1/48; H01Q 9/0414
See application file for complete search history.

(56) References Cited

FOREIGN PATENT DOCUMENTS

| | | | | |
|---|---|---|---|---|
| CN | 212257688 U | * 12/2020 | | H01Q 1/38 |
| CN | 216903331 U | * 7/2022 | | H01Q 1/38 |
| CN | 115133270 A | * 9/2022 | | H01Q 1/22 |

* cited by examiner

*Primary Examiner* — Hoang V Nguyen
(74) *Attorney, Agent, or Firm* — JCIPRNET

(57) ABSTRACT

A wireless transceiver includes a circuit board, an antenna, and a current offset component. The circuit board includes a first surface. The antenna includes a feed end, and the antenna is connected to the first surface of the circuit board through the feed end. The current offset component includes a ground end, the current offset component is connected to the first surface of the circuit board through the ground end, and the current offset component and the antenna are disposed at a same side of the circuit board. The antenna resonates in a frequency band, a length of the antenna is ¼ times a wavelength of the frequency band, and a length of the current offset component is ¼ times the wavelength of the frequency band.

10 Claims, 11 Drawing Sheets

WIRELESS TRANSCEIVER

CROSS-REFERENCE TO RELATED APPLICATION

This application claims the priority benefit of Taiwan application serial no. 113135194, filed on Sep. 18, 2024. The entirety of the above-mentioned patent application is hereby incorporated by reference herein and made a part of this specification.

BACKGROUND

Technical Field

This disclosure relates to a wireless transceiver, and in particular to a wireless transceiver that can provide a more suitable antenna radiation pattern.

Description of Related Art

Currently there are two types of wireless transceivers for wireless headsets, one is the USB long wireless transceiver, and the main body of the transceiver extends along the direction of the USB, like the shape of a USB flash drive. The advantage is that the transceiver has a good transmitting and receiving distance, the disadvantage is that it is too long in appearance, and when plugged into a laptop computer, it is easy to be knocked off because it is too protruding.

Therefore, in recent years, most of the wireless transceiver design has been changed to a horizontal type, the main body of the transceiver extends along the direction perpendicular to the connector. When plugged into a laptop computer, the overall transceiver is not too protruding, and the appearance is more in line with market demand. However, the disadvantage is that due to the constraints of the external shape, the antenna design is limited to a limited space, and the dead spot of the antenna radiation pattern will be in the direction of the user, resulting in a dead spot for transmitting and receiving.

SUMMARY

The disclosure provides a wireless transceiver, capable of providing a more suitable antenna radiation pattern.

The wireless transceiver of the disclosure includes a circuit board, an antenna, and a current offset component. The circuit board includes a first surface. The antenna includes a feed end, and the antenna is connected to the first surface of the circuit board through the feed end. The current offset component includes a ground end. The current offset component is connected to the first surface of the circuit board through the ground end, and the current offset component and antenna are disposed at a same side of the circuit board. The antenna resonates in a frequency band, a length of the antenna is ¼ times a wavelength of the frequency band, and a length of the current offset component is ¼ times the wavelength of the frequency band.

In an embodiment of the disclosure, a distance between the antenna and the current offset component is between 0.5 millimeters (mm) and ½ times the wavelength of the frequency band.

In an embodiment of the disclosure, a difference between a width of the antenna and a width of the current offset component is less than or equal to 10%.

In an embodiment of the disclosure, each of a width of the antenna and a width of the current offset component is between 0.2 mm and 3 mm.

In an embodiment of the disclosure, the circuit board includes a second surface opposite to the first surface and a side surface between the first surface and the second surface, one of the antenna and the current offset component includes a first section, a second section, and a third section connected in a U-shape, at least a portion of the first section is flat against the first surface, the second section faces the side surface, and at least a portion of the third section faces the second surface.

In an embodiment of the disclosure, the other one of the antenna and the current offset component includes a fourth section, a fifth section, and a sixth section that are connected, at least a portion of the fourth section is flat against the first surface, the fifth section faces the side surface, and a least a portion of the sixth section faces the second surface.

In an embodiment of the disclosure, the other one of the antenna and the current offset component includes a fourth section, a fifth section, and a sixth section that are connected, at least a portion of the fourth section is flat against the first surface, the fifth section is located next to the side surface, and the sixth section passes through the U-shape.

In an embodiment of the disclosure, the other one of the antenna and the current offset component includes a meandering section disposed on the first surface.

In an embodiment of the disclosure, the antenna or the current offset component having the meandering section includes a section extending to the second surface or outside of the circuit board.

In an embodiment of the disclosure, the circuit board includes a second surface opposite to the first surface and a side surface between the first surface and the second surface, at least one of the antenna and the current offset component includes a first section, a second section, a third section, and a fourth section that are connected, the first section stands on the first surface, at least a portion of the second section faces the first surface, the third section faces the side surface, and at least a portion of the fourth section faces the second surface.

Based on the above, the antenna of the wireless transceiver of the disclosure is connected to the first surface of the circuit board through the feed end. The wireless transceiver also includes the current offset component. The current offset component is connected to the first surface of the circuit board through the ground end, and the current offset component and antenna are disposed at the same side of the circuit board. The antenna resonates in a frequency band, the length of the antenna is ¼ times the wavelength of the frequency band, and the length of the current offset component is ¼ times the wavelength of the frequency band. Such a design allows the current in a certain direction (e.g., parallel to the long side direction of the circuit board) generated by the antenna on the circuit board to be offset by the current offset component, leaving the current in another direction (e.g., perpendicular to the long side direction of the circuit board) on the circuit board, which in turn generates different polarization current distributions (e.g., orthogonal polarization current distributions), which in turn stimulates different antenna field patterns (e.g., orthogonal antenna field patterns), improves the chances of dead spots of antenna radiation patterns occurring in the direction of the user, and improve the sending and receiving effect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
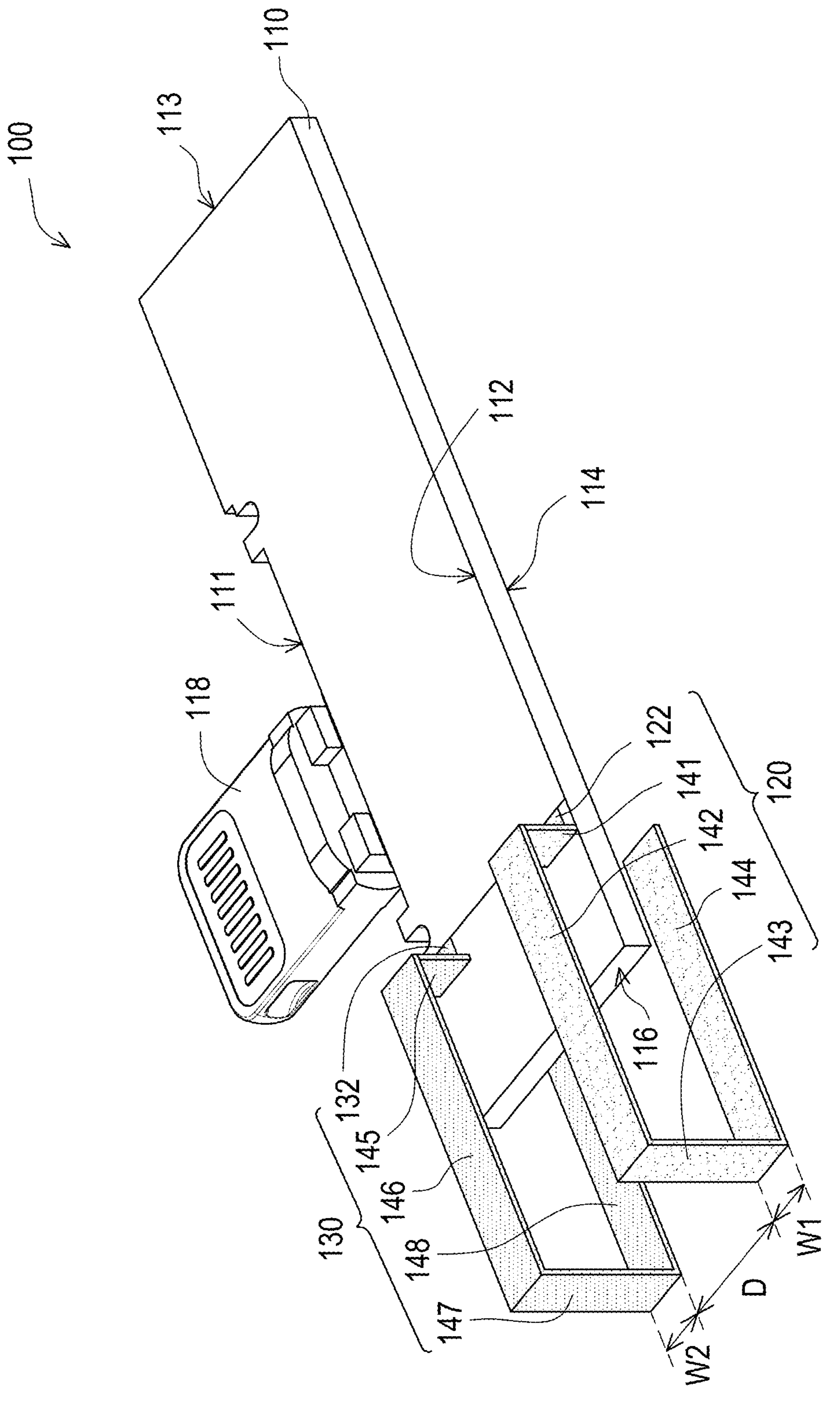
FIG. 1 is a schematic three-dimensional diagram of a wireless transceiver according to an embodiment of the disclosure.
Figure 2:
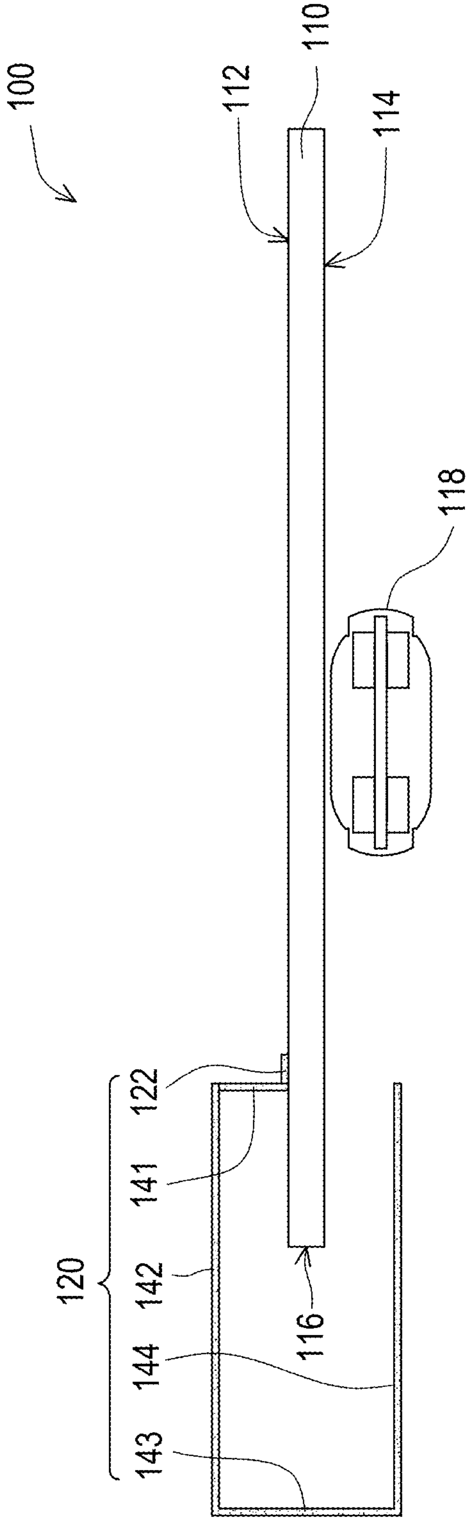
FIG. 2 is a side diagram of FIG. 1.

FIG. 1 is a schematic three-dimensional diagram of a wireless transceiver according to an embodiment of the disclosure. FIG. 2 is a side diagram of FIG. 1. Referring to FIG. 1 and FIG. 2, a wireless transceiver 100 of this embodiment includes a circuit board 110, an antenna 120, and a current offset component 130. In this embodiment, the circuit board 110 is rectangular, and a connector 118 is disposed on a side 111 of the long side of the circuit board 110. Such a design allows the wireless transceiver 100 to not protrude too much from the surface of the device when the connector 118 is plugged into the connected device (such as a laptop computer), thus reducing the chance of being damaged by impact. The connector 118 is, for example, a USB type C or lightening connector, and can provide reversible plugging characteristics.

The circuit board 110 includes a first surface 112 and a second surface 114 opposite to each other, and a side surface 116 located between the first surface 112 and the second surface 114. The side surface 116 is, for example, the side surface on the short side of the circuit board 110. The current offset component 130 and the antenna 120 are disposed at the same side of the circuit board 110, such as the side surface 116 on the short side. Of course, in an embodiment, the current offset component 130 and antenna 120 can also be disposed on the other side surface 113 of the circuit board 110, as long as they are at the same side of the circuit board 110.

The antenna 120 includes a feed end 122, and the antenna 120 is connected to the first surface 112 of the circuit board 110 through the feed end 122. In this embodiment, the antenna 120 includes a first section 141, a second section 142, a third section 143, and a fourth section 144 that are connected. The first section 141 is connected to the feed end 122 and stands on the first surface 112, at least a portion of the second section 142 faces the first surface 112, the third section 143 faces the side surface 116, and at least a portion of the fourth section 144 faces the second face 114.

The current offset component 130 includes a ground end 132. The current offset component 130 is connected to the first surface 112 of the circuit board 110 through the ground end 132, and is connected to a ground plane (not shown) of the circuit board 110. The current offset component 130 can be a single conductor disposed on the circuit board 110 by soldering, or a combination of a short-circuiting component with a conductor, or a combination of a pogo pin with a flexible circuit board or LDS, and there is no limitation on the form of the current offset component 130.

In this embodiment, the shape of the current offset component 130 is the same as the shape of the antenna 120. The current offset component 130 includes a fifth section 145, a sixth section 146, a seventh section 147, and an eighth section 148 that are connected. The fifth section 145 is connected to the ground end 132 and stands on the first surface 112. At least a portion of the sixth section 146 faces the first surface 112, the seventh section 147 faces the side surface 116, and at least a portion of the eighth section 148 faces the second surface 114. Of course, the shape of the current offset component 130 can also be different from the shape of antenna 120, and is not limited by the diagram.

In this embodiment, the first section 141 of the antenna 120 stands on the first surface 112, leaving the second section 142 suspended. The fifth section 145 of the current offset component 130 stands on the first surface 112, leaving the sixth section 146 suspended. Therefore, the space between the second section 142 and the first surface 112 and the space between and the sixth section 146 and the first surface 112 is available for the electronic components (not shown) to be set up, which makes the layout of the circuit board 110 on the first surface 112 more flexible.

The antenna 120 resonates in a frequency band, e.g., 2.4 GHz, but is not limited thereto. The length of the antenna 120 (i.e., the total length of the first section 141, the second section 142, the third section 143, and the fourth section 144) is ¼ times the wavelength of the frequency band, and the length of the current offset component 130 (i.e., the total length of the fifth section 145, the sixth section 146, the seventh section 147, and the eighth section 148) is ¼ times the wavelength of the frequency band. The shapes of the current offset component 130 and the antenna 120 can be different, as long as the length complies with ¼ times the wavelength of the frequency band.

Such a design allows the current in a certain direction (e.g., parallel to the long side direction of the circuit board 110) generated by the antenna 120 on the circuit board 110 to be offset by the current generated by the current offset component 130, leaving the current in another direction (e.g., perpendicular to the long side direction of the circuit board 110) on the circuit board 110, which in turn generates different polarization current distributions (e.g., orthogonal polarization current distributions), which in turn stimulates different antenna field patterns (e.g., orthogonal antenna field patterns), and improves the chances of dead spots of antenna radiation patterns occurring in the direction of the user (near the side surfaces 113 or 116), reducing the possibility of receiving and transmitting dead spots.

It should be noted that in this embodiment, the current offset component 130 is closer to the connector 118 than the antenna 120, but the positions of the antenna 120 and the current offset component 130 can be interchanged. That is, in one embodiment, the antenna 120 may be closer to the connector 118 than the current offset component 130.

In addition, in this embodiment, a distance D between the antenna 120 and the current offset component 130 is between 0.5 millimeters (mm) and ½ times the wavelength of the frequency band to provide a radiation pattern compensation effect. In one embodiment, the distance D is 5 mm, but is not limited thereto.

In addition, the difference between a width W1 of the antenna 120 and a width W2 of the current offset component 130 is less than or equal to 10%. Such a design can have a better impedance matching effect. Each of the width W1 of the antenna 120 and the width W2 of the current offset component 130 is between 0.2 mm and 3 mm. In one embodiment, the widths W1 and W2 are both 2 mm, but is not limited thereto.

Figure 3:
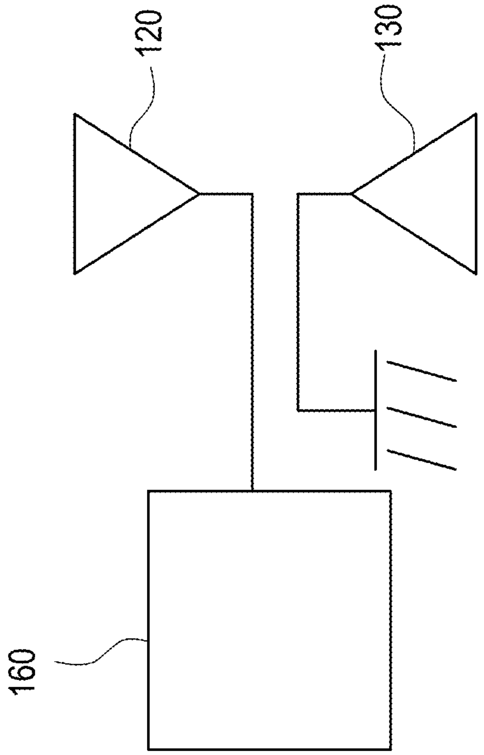
FIG. 3 is an equivalent circuit diagram of an antenna and a current offset component of FIG. 1.

FIG. 3 is an equivalent circuit diagram of an antenna and a current offset component of FIG. 1. Please refer to FIG. 3. The antenna 120 of this application is connected to a chip 160, and the current offset component 130 is grounded. The antenna 120 is single-feed and has the advantage of small size and simple design.

Figure 4:
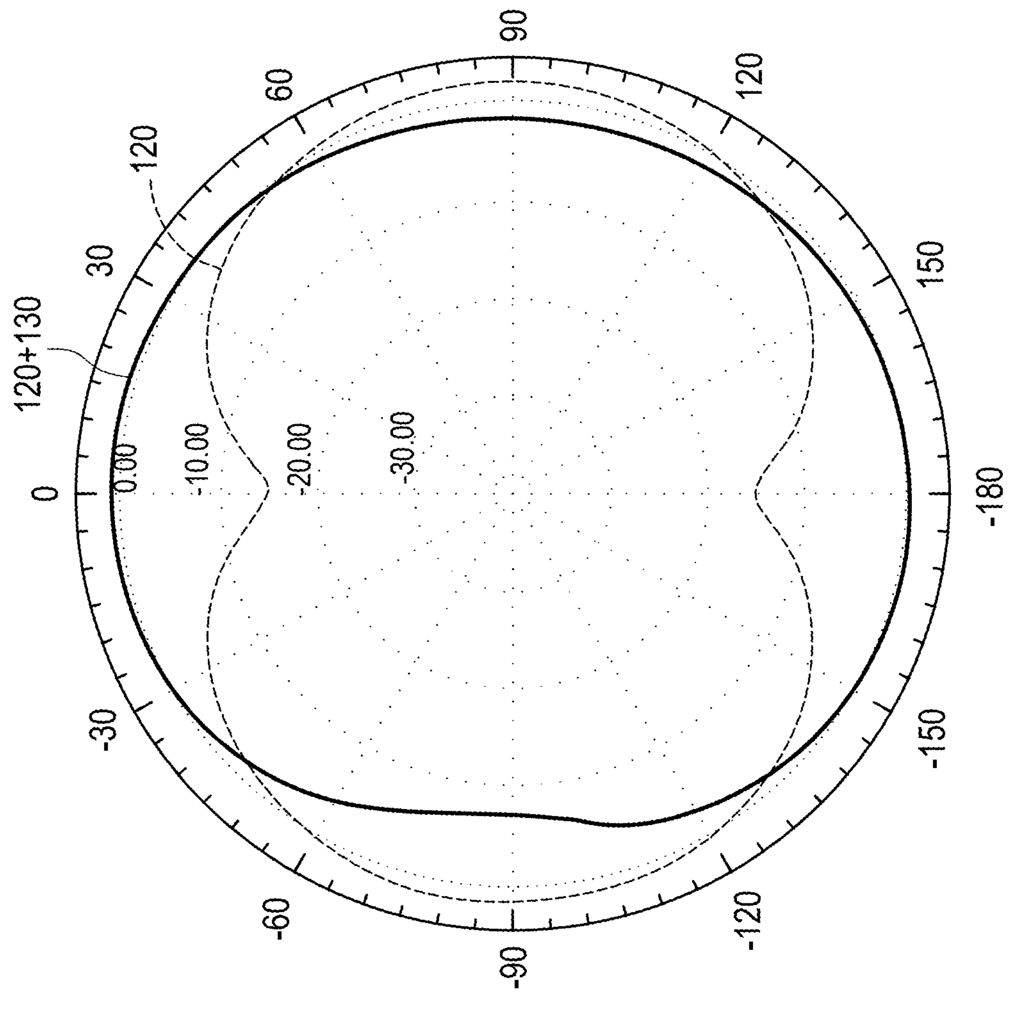
FIG. 4 is a radiation pattern diagram of only the antenna in FIG. 1 and the antenna and the current offset component in FIG. 1.

FIG. 4 is a radiation pattern diagram of only the antenna in FIG. 1 and the antenna and the current offset component in FIG. 1. It should be noted that FIG. 4 shows a simulated radiation pattern when the wireless transceiver 100 is plugged into the right port of a laptop computer through the connector 118 and is placed in the center of a circle viewed from a top-down perspective. In other words, the radiation pattern in FIG. 4 is to place the wireless transceiver 100 at the center of the circle, and the connector 118 of the wireless transceiver 100 faces the direction of −90 degrees, and the user is close to the direction of −180 degrees (below).

Please refer to FIG. 4. If the wireless transceiver 100 only has the antenna 120 in FIG. 1, there will be a null point in the direction of −180 degrees, resulting in poor sending and receiving signals. On the other hand, the radiation pattern of the wireless transceiver 100 having the antenna 120 and the current offset component 130 in FIG. 1 can perform well in the direction of −180 degrees, and can improve by about 15 dB in the direction close to the user.

The following describes the wireless transceiver of other embodiments. The same or similar components as those in the previous embodiment are represented by the same or similar symbols, and therefore will not be repeated in the following. Only the main differences will be explained.

Figure 5:
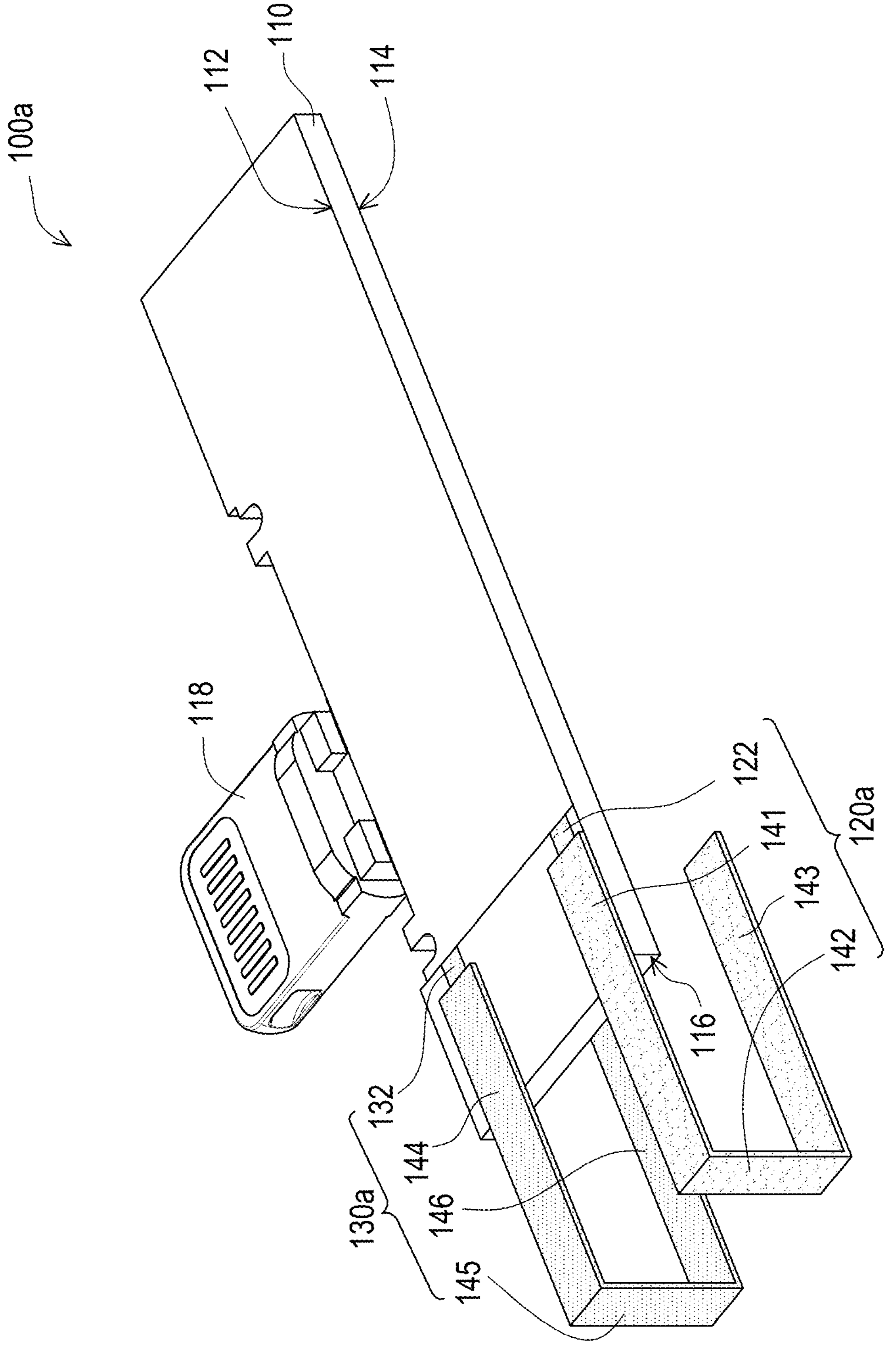
FIG. 5 is a schematic three-dimensional diagram of a wireless transceiver according to another embodiment of the disclosure.
Figure 6:
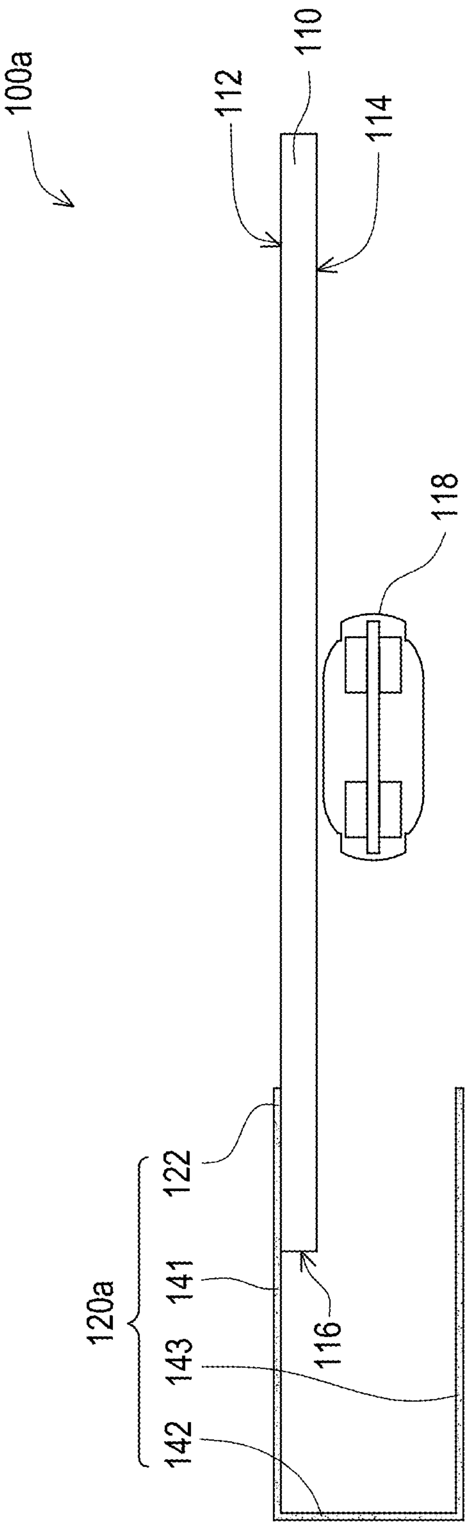
FIG. 6 is a side diagram of FIG. 5.

FIG. 5 is a schematic three-dimensional diagram of a wireless transceiver according to another embodiment of the disclosure. FIG. 6 is a side diagram of FIG. 5. Please refer to FIG. 5 and FIG. 6. The main difference between a wireless transceiver **100*a* of this embodiment and the wireless transceiver 100 of FIG. 1 is that the shapes of an antenna 120*a* and a current offset component 130*a*** are different.

Specifically, in this embodiment, the antenna **120*a* includes a first section 141, a second section 142, and a third section 143 connected in a U-shape. At least a portion of the first section 141 is flat against a first surface 112, the second section 142 faces a side surface 116, and at least a portion of the third section 143 faces a second surface 114**.

The current offset component **130*a* includes a fourth section 144, a fifth section 145, and a sixth section 146 that are connected. At least a portion of the fourth section 144 is flat against the first surface 112, the fifth section 145 faces the side surface 116, and at least a portion of the sixth section 146 faces the second surface 114**.

Since the first section 141 of the antenna **120*a* and the fourth section 144 of the current offset component 130*a* are flat against the first surface 112, this design allows the antenna 120*a* and the current offset component 130*a* to be more firmly installed on the circuit board 110**, and also reduce the overall height and effectively reduces the size.

Of course, the shapes of the antenna **120*a* and the current offset component 130*a*** may be different, and their positions may be interchanged or set on other sides, without being limited by the drawings.

Figure 7:
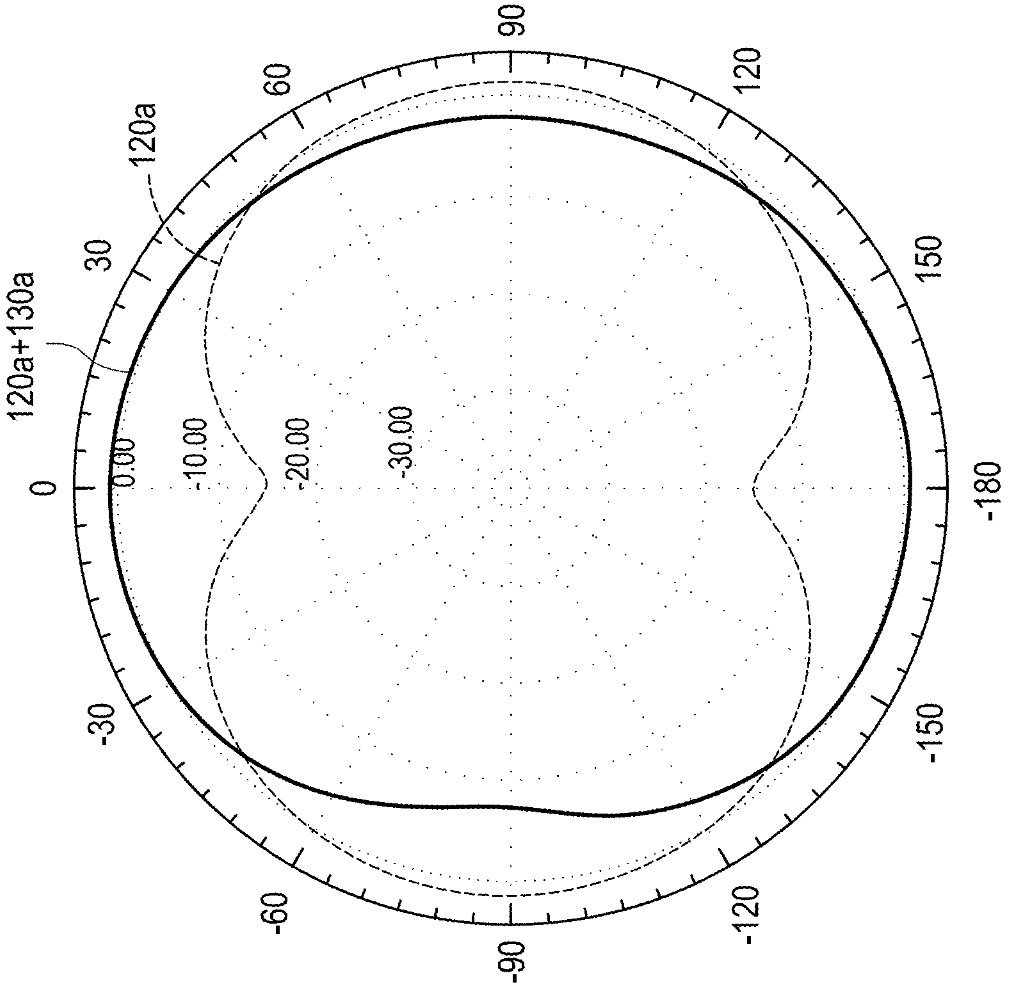
FIG. 7 is a radiation pattern diagram of only an antenna in FIG. 5 and an antenna and a current offset component in FIG. 5.

FIG. 7 is a radiation pattern diagram of only an antenna in FIG. 5 and an antenna and a current offset component in FIG. 5. Similarly, FIG. 7 shows a simulated radiation pattern when the wireless transceiver **100*a* is plugged into the right port of a laptop computer through a connector 118 and is placed in the center of a circle viewed from a top-down perspective. In other words, the radiation pattern in FIG. 7 is to place the wireless transceiver 100*a* at the center of the circle, and the connector 118 of the wireless transceiver 100*a*** faces the direction of −90 degrees, and the user is close to the direction of −180 degrees (below).

Please refer to FIG. 7. If the wireless transceiver only has the antenna **120*a* in FIG. 5, there will be a null point in the direction of −180 degrees, resulting in poor sending and receiving signals. On the other hand, the radiation pattern of the wireless transceiver 100*a* having the antenna 120*a* and the current offset component 130*a* in FIG. 5** can perform well in the direction of −180 degrees.

Figure 8:
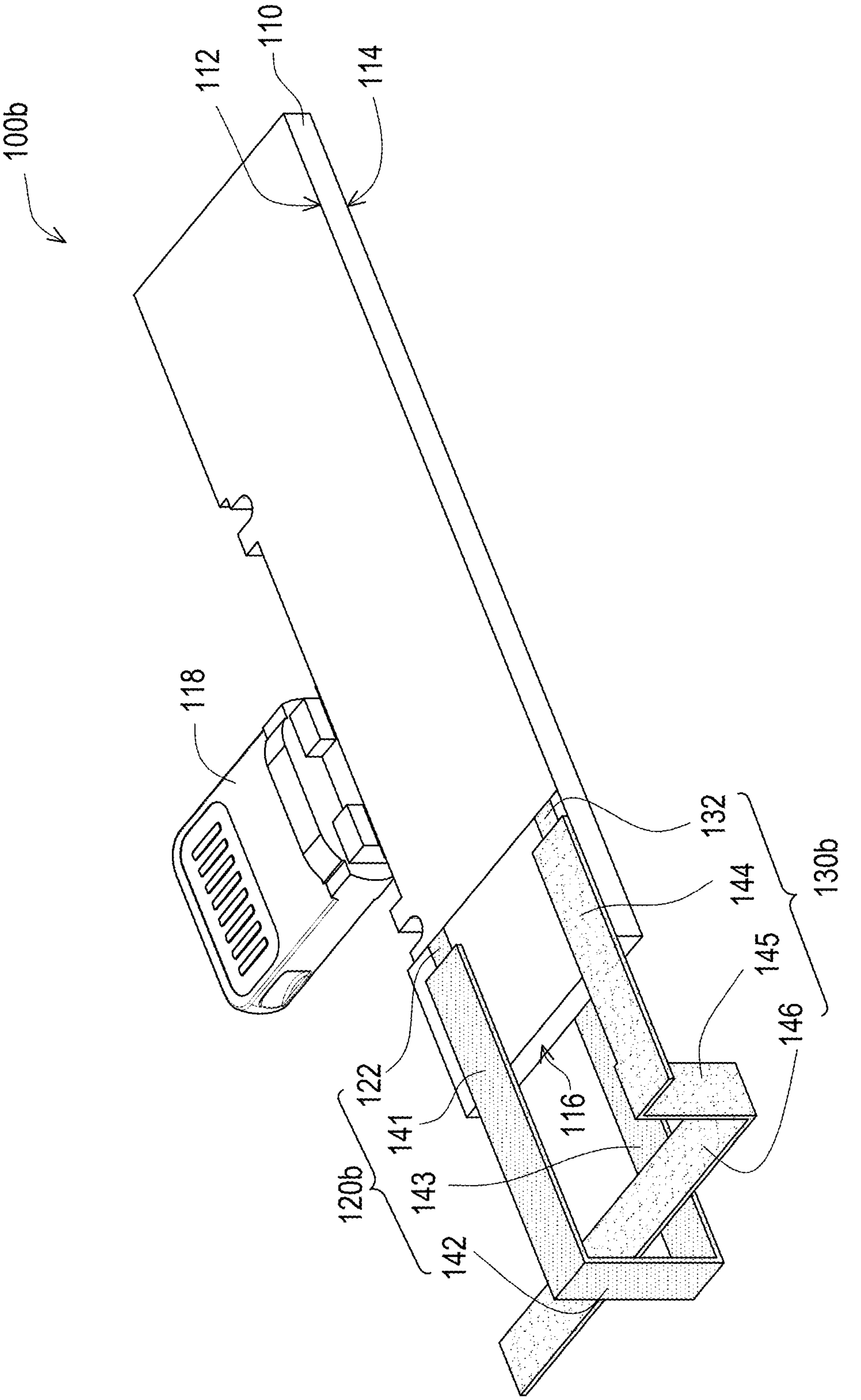
FIG. 8 is a schematic three-dimensional diagram of a wireless transceiver according to another embodiment of the disclosure.
Figure 9:
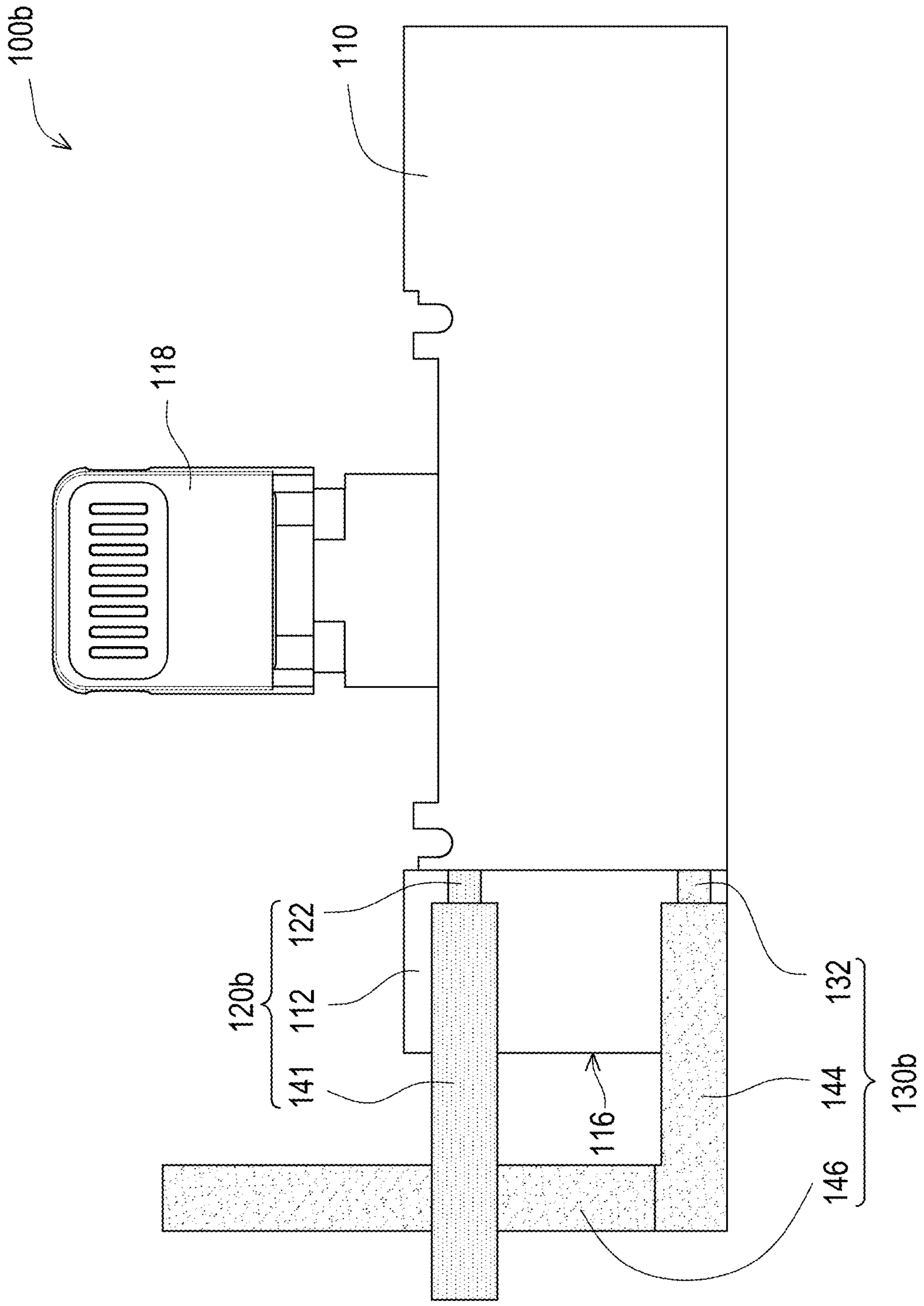
FIG. 9 is a top diagram of FIG. 8.

FIG. 8 is a schematic three-dimensional diagram of a wireless transceiver according to another embodiment of the disclosure. FIG. 9 is a top diagram of FIG. 8. Please refer to FIG. 8 and FIG. 9. The main difference between a wireless transceiver **100*b* of this embodiment and the wireless transceiver 100*a* of FIG. 5 is that the positions of an antenna 120*b* and a current offset component 130*b* and the shape of the current offset component 130*b*** is different.

In this embodiment, the antenna **120*b* is closer to a connector 118 than the current offset component 130*b*. In addition, in this embodiment, the antenna 120*b* is U-shaped like the antenna 120*a* in FIG. 5. The current offset component 130*b* includes a fourth section 144, a fifth section 145, and a sixth section 146 are connected. At least a portion of the fourth section 144 is flat against a first surface 112, the fifth section 145 is located next to a side surface 116, and the sixth section 146 passes through the U-shape. Such a design can save space, and the current offset component 130*b* can utilize the space occupied by the antenna 120*b*. Of course, the positions and shapes of the antenna 120*b* and the current offset component 130*b*** can be interchanged.

Figure 10:
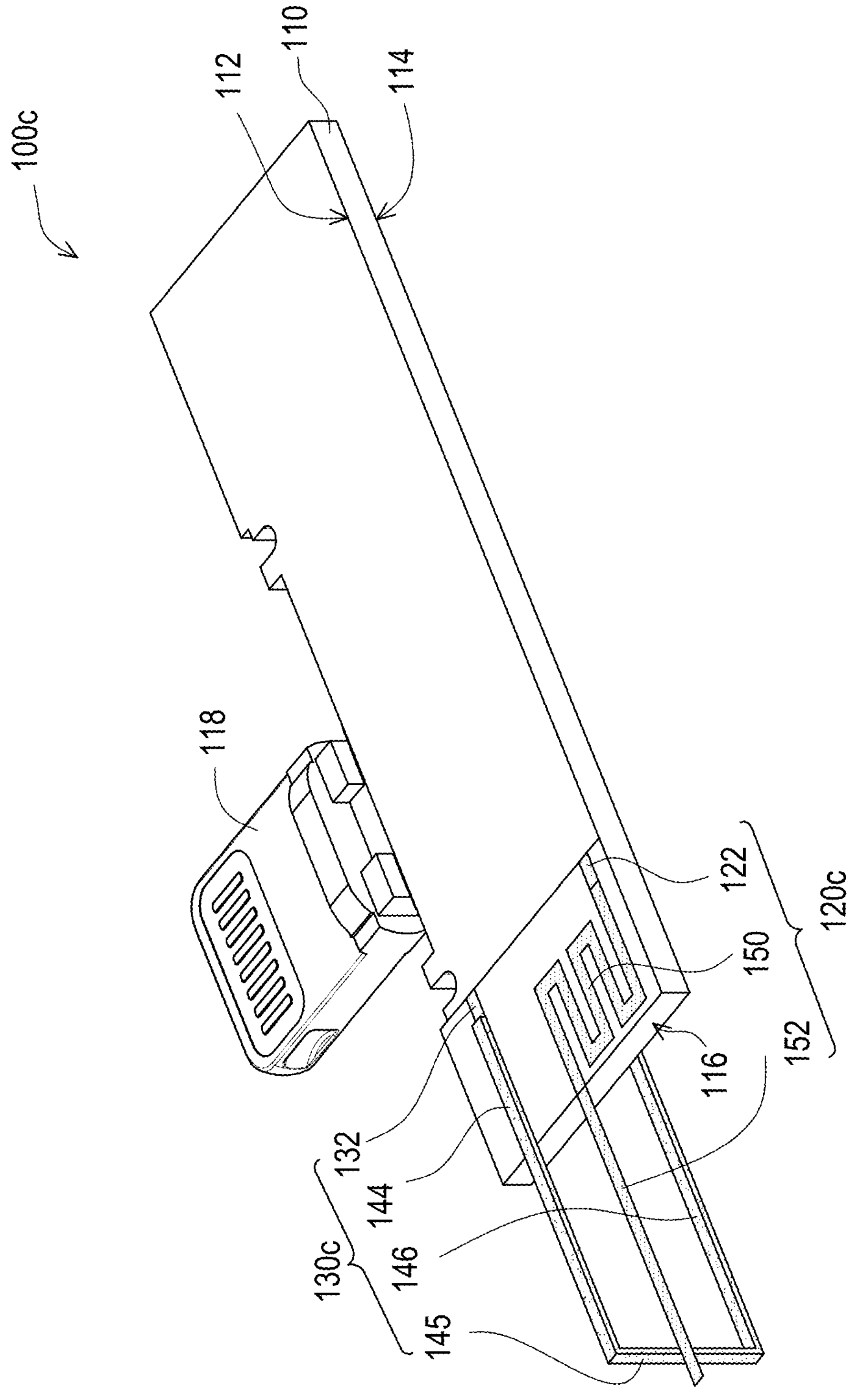
FIG. 10 is a schematic three-dimensional diagram of a wireless transceiver according to another embodiment of the disclosure.
Figure 11:
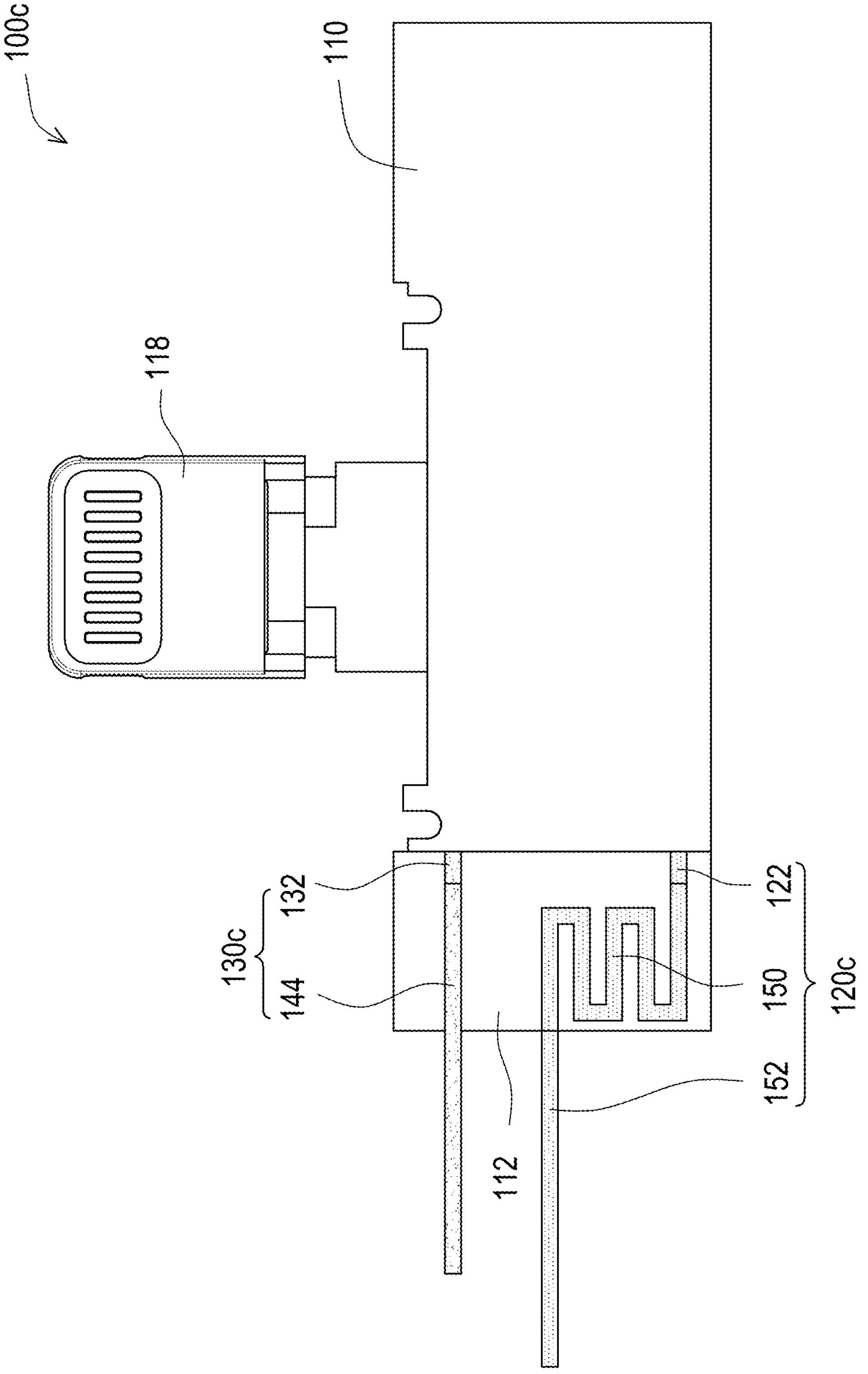
FIG. 11 is a top diagram of FIG. 10.

FIG. 10 is a schematic three-dimensional diagram of a wireless transceiver according to another embodiment of the disclosure. FIG. 11 is a top diagram of FIG. 10. Please refer to FIG. 10 and FIG. 11. The main difference between a wireless transceiver **100*c* of this embodiment and the wireless transceiver 100*a* of FIG. 5 is that the shape of the antenna 120*c* and the widths of the antenna 120*c* and the current offset component 130*c*** are different.

In this embodiment, the antenna **120*c* includes a meandering section 150 disposed on a first surface 112. An antenna 120*c* having the meandering section 150 includes a section 152 that extends outside of a circuit board 110. In one embodiment, the section 152 of the antenna 120*c* outside of the first surface 112 may extend to a second surface 114. This design allows the antenna 120*c* to utilize more space of the circuit board 110** itself for configuration.

Of course, the positions and shapes of the antenna **120*c* and the current offset component 130*c*** can be interchanged.

To sum up, the antenna of the wireless transceiver of the disclosure is connected to the first surface of the circuit board through the feed end. The wireless transceiver also includes the current offset component. The current offset component is connected to the first surface of the circuit board through the ground end, and the current offset component and antenna are disposed at the same side of the circuit board. The antenna resonates in a frequency band, the length of the antenna is ¼ times the wavelength of the frequency band, and the length of the current offset component is ¼ times the wavelength of the frequency band. Such a design allows the current in a certain direction (e.g., parallel to the long side direction of the circuit board) generated by the antenna on the circuit board to be offset by the current offset component, leaving the current in another direction (e.g., perpendicular to the long side direction of the circuit board) on the circuit board, which in turn generates different polarization current distributions (e.g., orthogonal polarization current distributions), which in turn stimulates different antenna field patterns (e.g., orthogonal antenna field patterns), improves the chances of dead spots of antenna radiation patterns occurring in the direction of the user, and improve the sending and receiving effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wireless transceiver, comprising:

a circuit board, comprising a first surface;

an antenna, comprising a feed end, the antenna being connected to the first surface of the circuit board through the feed end; and a current offset component, comprising a ground end, the current offset component being connected to the first surface of the circuit board through the ground end, and the current offset component and the antenna being disposed at a same side of the circuit board, wherein the antenna resonates in a frequency band, a length of the antenna is ¼ times a wavelength of the frequency band, and a length of the current offset component is ¼ times the wavelength of the frequency band.

2. The wireless transceiver according to claim 1, wherein a distance between the antenna and the current offset component is between 0.5 millimeters (mm) and ½ times the wavelength of the frequency band.

3. The wireless transceiver according to claim 1, wherein a difference between a width of the antenna and a width of the current offset component is less than or equal to 10%.

4. The wireless transceiver according to claim 1, wherein each of a width of the antenna and a width of the current offset component is between 0.2 mm and 3 mm.

5. The wireless transceiver according to claim 1, wherein the circuit board comprises a second surface opposite to the first surface and a side surface between the first surface and the second surface, one of the antenna and the current offset component comprises a first section, a second section, and a third section connected in a U-shape, at least a portion of the first section is flat against the first surface, the second section faces the side surface, and at least a portion of the third section faces the second surface.

6. The wireless transceiver according to claim 5, wherein the other one of the antenna and the current offset component comprises a fourth section, a fifth section, and a sixth section that are connected, at least a portion of the fourth section is flat against the first surface, the fifth section faces the side surface, and a least a portion of the sixth section faces the second surface.

7. The wireless transceiver according to claim 5, wherein the other one of the antenna and the current offset component comprises a fourth section, a fifth section, and a sixth section that are connected, at least a portion of the fourth section is flat against the first surface, the fifth section is located next to the side surface, and the sixth section passes through the U-shape.

8. The wireless transceiver according to claim 5, wherein the other one of the antenna and the current offset component comprises a meandering section disposed on the first surface.

9. The wireless transceiver according to claim 8, wherein the antenna or the current offset component having the meandering section comprises a section extending to the second surface or outside of the circuit board.

10. The wireless transceiver according to claim 1, wherein the circuit board comprises a second surface opposite to the first surface and a side surface between the first surface and the second surface, at least one of the antenna and the current offset component comprises a first section, a second section, a third section, and a fourth section that are connected, the first section stands on the first surface, at least a portion of the second section faces the first surface, the third section faces the side surface, and at least a portion of the fourth section faces the second surface.

* * * * *